United States Patent [19]

Braun

[11] Patent Number: 4,619,349

[45] Date of Patent: Oct. 28, 1986

[54] VIBRATION ISOLATOR

[75] Inventor: Dieter Braun, Otterfing, Fed. Rep. of Germany

[73] Assignee: Messerschmitt-Boelkow-Blohm Gesellschaft mit beschraenkter Haftung, Munich, Fed. Rep. of Germany

[21] Appl. No.: 761,956

[22] Filed: Aug. 2, 1985

[30] Foreign Application Priority Data

Aug. 4, 1984 [DE] Fed. Rep. of Germany ....... 3428820

[51] Int. Cl.⁴ .............................................. F16F 7/10
[52] U.S. Cl. ................................ 188/380; 244/17.27; 248/559; 267/160; 416/500
[58] Field of Search ................................. 188/378–380, 188/381; 267/158, 160, 140.5, 30, 148, 149, 136, 150, 8 R, 140.1; 416/134 A, 500; 244/17.27, 17.25, 17.21, 17.11, 54; 248/559, 638, 636, 626; 74/552, 574

[56] References Cited

U.S. PATENT DOCUMENTS

| 3,317,166 | 5/1967 | Janssen | 267/158 X |
| 3,502,290 | 3/1970 | Legrand et al. | 267/160 X |
| 4,405,101 | 9/1983 | Carlson et al. | 188/380 X |

FOREIGN PATENT DOCUMENTS 3134533 6/1982 Fed. Rep. of Germany .
651904 1/1963 Italy ..................................... 188/380

Primary Examiner—Duane A. Reger
Assistant Examiner—Michael P. Gilday
Attorney, Agent, or Firm—W. G. Fasse; D. H. Kane, Jr.

[57] ABSTRACT

A vibration isolator (1) with two degrees of freedom works according to the anti-resonance principle. The vibration isolator is arranged, for example, between a first body, such as a helicopter frame 13, and a second vibration generating body such as a rotor-transmission unit 12 vibrating at a predominant frequency. A spring arrangement (2) is connected to the attachment points (14, 15) for the first and second bodies. The spring arrangement works in conjunction with a pendulum rod (3) which is attached to the two bodies (12, 13) by spherical pivot bearings (5, 10). The vibration isolator has a compact construction and a low characteristic damping since the spring arrangement includes several relatively small semi-circular or spiral-shaped wound leaf springs (7-1 to 7-4) which extend between an inner ring (4) and an outer ring (6). The pendulum rod is held in a spherical pivot bearing (5) in the inner ring, and a further spherical pivot bearing (10) is connected by a flange (9) to the outer ring. A pendulum weight (11) is slidably mounted on the free end of the pendulum rod. The other end of the pendulum rod is held by the two pivot bearings.

5 Claims, 3 Drawing Figures

VIBRATION ISOLATOR

FIELD OF THE INVENTION

The invention relates to a vibration isolator with two degrees of freedom, which works according to the anti-resonance principle. The vibration isolator is arranged between a first body, for example, a helicopter frame, and a second body, for example a rotor-transmission unit, which vibrates at a predominant frequency. The isolator comprises a spring arrangement between the two attachment points for the first and second bodies, whereby the spring arrangement cooperates with a pendulum rod connected to the first and second bodies by means of spherical pivot bearings. A pendulum weight is mounted on the free end of the pendulum rod.

DESCRIPTION OF THE PRIOR ART

Such a vibration isolator is described in the German Patent Publication (DE-OS) No. 3,134,533. At least three, but preferably four, such vibration isolators may be used to connect a helicopter frame to the main drive for the helicopter rotor. In helicopters, air frame vibrations are mainly generated by periodic forces and moments, which are transmitted from the rotor blades through the rotor hub or head and main gearbox to the helicopter frame. The frequency of these forces and moments is dependent on the number of rotor blades and the rotational speed of the rotor. The transmission of this so-called rotor excitation into the helicopter frame is prevented to a large degree by the vibration isolators by means of the pendulum weights which vibrate in anti-resonance to the rotor-transmission vibration.

In the known vibration isolator, the pendulum rod is held in two spherical pivot bearings, whereby one of the spherical pivot bearings is connected directly to the main gearbox and the other pivot bearing is connected to the helicopter frame. One end of the pendulum rod is provided with a trimmable or adjustable pendulum weight, while the other end of the pendulum rod, which extends through the bearing arrangement, is connected by a further spherical bearing to the helicopter frame for acting as an isolating spring. The two spherical pivot bearings for the main gearbox and for the helicopter frame are located directly adjacent to each other, whereby the forces originating in the rotor are introduced into the pendulum rod through the pivot bearing. The pivot bearings must thus be constructed so that they can take up not only dynamic loads but also high static loads. However, the result of such a construction necessarily increases the internal damping of the vibration isolator, so that only a partial isolation of actuating forces is possible.

Moreover, since the two bearings of the combined pendulum/spring element, which are connected to the helicopter frame, are spaced relatively far apart from each other, it cannot be avoided that dynamic moments are transmitted to the helicopter frame, even though dynamic forces may be effectively isolated.

OBJECTS OF THE INVENTION

In view of the above it is the aim of the invention to achieve the following objects singly or in combination:

to achieve an effective vibration isolation in a vibration isolator of the above described type, with a convenient and advantageous bearing arrangement and spring construction requiring but a small number of bearings;

to construct such a vibration isolator so as to avoid static loading of the bearings, thereby allowing smaller bearings to be used and to achieve a low internal damping for improving the vibration isolation effect;

to reduce the transmission of dynamic moments in addition to the prevention of transmitting dynamic forces by such a vibration isolator; and to allow longitudinal relative movements, of the bodies connected by such vibration isolators, in a direction parallel to the pendulum rod, without losing a high stiffness in a direction perpendicular to the longitudinal axis of the pendulum rod.

SUMMARY OF THE INVENTION

These objects have been achieved in a vibration isolator according to the invention, wherein the spring arrangement comprises several leaf springs each wound in a semi-circle or a spiral and arranged in a spring winding plane extending substantially perpendicular to a longitudinal axis of a pendulum rod. The leaf springs extend between an inner ring and an outer ring and allow a relative motion between the inner and outer rings in a direction perpendicular to the winding plane of the springs, that is, in the direction of the pendulum rod. The first body, such as the helicopter frame is connected to the inner ring, and the second body, such as the rotor-drive unit, is connected to the outer ring. The end of the pendulum rod opposite the pendulum weight is supported by a spherical pivot bearing in the inner ring and by another spherical pivot bearing connected to the outer ring.

The essential feature of a vibration isolator according to the invention is the spring arrangement provided between the inner ring and the outer ring, whereby the arrangement comprises at least three interlocking semi-circular or spiral-shaped leaf spring elements. Such a spring arrangement has the characteristic that even with a compact construction it achieves a defined equal stiffness in all directions in the spring winding plane. The arrangement can transmit high static loads with very slight spring motions or spring displacements.

The inner and outer rings connect the vibration isolator with the two bodies which are to be vibrationally decoupled from each other. In order to achieve the above mentioned isolation of the rotor excitation or vibrations from the helicopter frame, the helicopter frame is connected to the inner ring and the main gearbox is connected to the outer ring of each of several of such vibration isolators. Since the pendulum rod is supported in a spherical pivot bearing in the inner ring and in another spherical pivot bearing connected to the outer ring, static loads are not transmitted through these pivot bearings. For this reason, these spherical pivot bearings, preferably elastomer bearings, can be of smaller size than in the prior art. This feature achieves a smaller internal isolator damping which in turn improves the vibration isolation.

If a vibration isolator according to the invention is used for suspending a helicopter frame from the helicopter main gearbox, then the frame-side attachment point for the isolator spring arrangement and the frame-side hinge point of the inertial pendulum are approximately coincident since the rings are relatively small. As a result, the transmission of dynamic moments to the frame is substantially prevented. The gearbox-side hinge point of the inertial pendulum formed by the spherical pivot bearing connected to the outer ring is preferably located between the pivot bearing in the inner ring and the pendulum weight and directly adjacent to the pivot bearing in the inner ring. These features provide an overall increased isolation effect. The spacing between the resonance and anti-resonance points on the transmissibility curve or characteristic of the vibration isolator is thereby increased. Likewise, the relative movements within the vibration isolator remain smaller during dynamic excitations.

The vibration isolator must allow relative movements in the longitudinal direction of the pendulum rod, between the gearbox-side and frame-side attachment points of the vibration isolator. Such movements are made possible in the vibration isolator according to the invention by the form of the spring arrangement between the inner and outer rings. For this purpose the spring arrangement is considerably softer perpendicular to its winding plane than in the directions in the winding plane. In other words, the spring arrangement has a substantially softer characteristic in the z-direction than in the x- and y-directions. This softness or flexibility of the spring arrangement perpendicular to the winding plane may be enhanced by lengthwise slits or slots in the leaf springs. The outer ring may be coupled to its respective spherical pivot bearing by a membrane-like connecting member. This membrane is elastic in the lengthwise direction of the pendulum rod which defines the z-direction, yet is very stiff in its radial directions in order to transmit the forces. This membrane may, for example, be a fiber-reinforced plate or flange which exhibits these stiffness characteristics. Alternatively, additional cylindrical elastomer layers may be integrated into the pivot bearings, to allow such relative movements in the lengthwise direction of the pendulum rod.

The vibration isolator of the invention combines a compactly constructed, low-damping spring arrangement with inner and outer rings, whereby the spring arrangement has a definite stiffness in the winding plane of the individual spring elements and a considerably lower stiffness perpendicular to this plane, and with an inertial pendulum held by only two low-damping, spherical pivot bearings which are not loaded by static forces, to form a highly effective anti-resonance vibration isolator.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
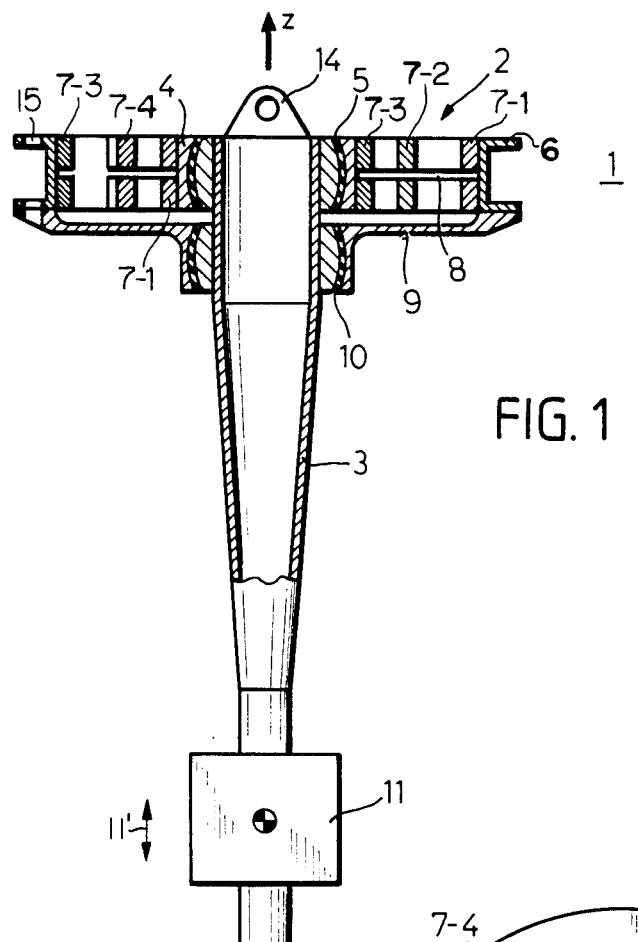
FIG. 1 is a lengthwise partial sectional view of a vibration isolator with two degrees of freedom, according to the invention.
Figure 2:
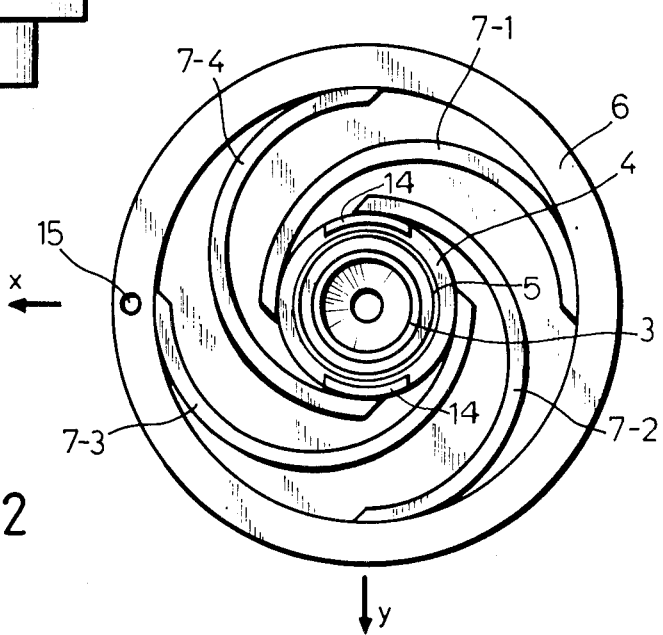
FIG. 2 is a top view in a direction opposite the z-axis of the vibration isolator shown in FIG. 1.

FIG. 1 shows a vibration isolator 1 comprising a spring arrangement 2 and a pendulum rod 3. The spring arrangement 2 comprises an inner ring 4, made of metal for example, which concentrically encircles the pendulum rod 3. The inner ring 4 includes a spherical elastomer pivot bearing 5 for supporting the pendulum rod 3. An outer ring 6, also made of metal, is located coaxially around the inner ring 4. As shown in FIG. 2 four substantially semi-circular leaf spring elements 7-1 to 7-4 made of metal or possibly also of fiber-reinforced materials, extend between the inner ring 4 and the outer ring 6. Each of the leaf springs 7-1 to 7-4 is rigidly attached at its ends to the inner ring 4 and the outer ring 6. The wrapping or winding plane of the leaf springs 7 is the x-y plane, which lies perpendicular to the z-axis corresponding to the lengthwise axis of the pendulum rod 3. This spring arrangement 2 has a very compact structure and achieves an equal stiffness or spring tension in the directions of the x- and y-axes or in the radial plane defined by these x- and y-axes. In order to reduce the stiffness in the z-direction, the leaf springs 7 may include slits or slots 8 extending lengthwise in each leaf spring 7. If these slots 8 extend through the full length of the leaf springs 7 then double leaf springs will in effect replace each single leaf spring 7.

The outer ring 6 is connected to another spherical elastomer pivot bearing 10 by means of a disc-like flange 9 which may be made of fiber-reinforced material. The pivot bearing 10 is arranged directly adjacent to the pivot bearing 5 on the side toward the free end of the pendulum rod 3. In order to permit relative motion in the z-direction between the inner ring 4 and the outer ring 6, the flange 9 has a membrane-like construction, so that it can flex in the z-direction, but is very stiff in a radial direction. The pendulum rod 3, which is held at one end in the two pivot bearings 5 and 10, comprises at the other end a pendulum weight 11, which is adjustable in a conventional manner in the z-direction as indicated by the double arrow 11' in FIG. 1 in order to tune the characteristic frequency of the vibration isolator for the anti-resonance purpose.

Figure 3:
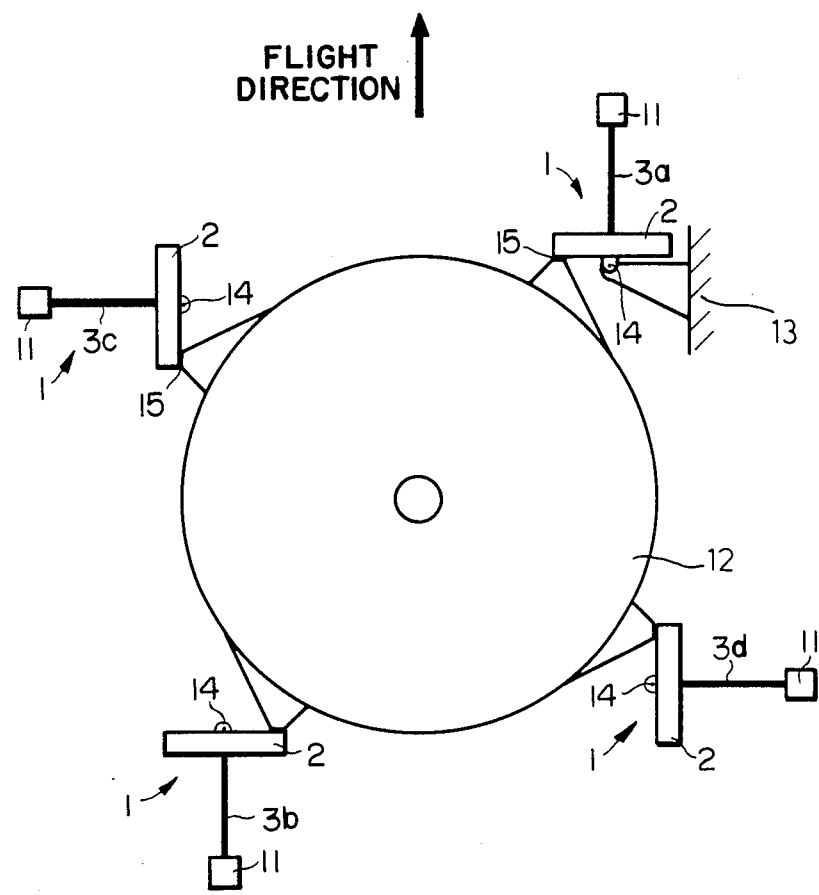
FIG. 3 is a schematic view of the connection of a helicopter main gearbox to a helicopter frame by means of four vibration isolators according to the invention.

In order to attach two bodies to the vibration isolator to achieve a vibration-decoupled connection between them, two lugs 14 are provided on the inner ring 4 and an attachment point 15 is provided on the outer ring 6. The attachment point 15 may, for example, be a bored hole or similarly a lug with holes therein. As shown in FIG. 3, the described vibration isolator with two degrees of freedom may, for example, be used for connecting a main gearbox 12 of a helicopter, not shown, to a helicopter frame 13. The main gearbox 12 is secured to the outer ring 6 of each of the four vibration isolators 1 at the attachment point 15. The helicopter frame 13 is attached to each of the four inner rings 4 by means of the lugs 14 as shown at the upper right-hand corner of FIG. 3 for one of the vibration isolators 1. Four vibration isolators 1 are used to connect the main drive 12 to the helicopter frame 13, whereby the axes 3a and 3b of the pendulum rods 3 of each of two oppositely located vibration isolators 1 extend parallel to the direction of flight, and whereby the axes 3c and 3d of the pendulum rods 3 of each of the two other oppositely located vibration isolators 1 extend perpendicular to the flight direction. Other orientations and arrangements of the vibration isolators are also possible. Thus, for example, the axis of each of the pendulum rods may extend radially outward from the center point of the main drive 12.

Due to the symmetric construction of the spring arrangement 2 and of the inertial pendulum 3 with its weight 11, the vibration isolator 1 prevents the transmission of dynamic forces in the x-y-plane. The reduced stiffness of the spring arrangement 2 including the flange 9 in the direction of the z-axis limits the transmission of dynamic forces in the z-direction to small values.

The above mentioned relative movements in the z-direction between the inner ring 4 and the outer ring 6, and correspondingly between the frame and gearbox attachment points 14, 15 of the vibration isolator 1, which is permitted by the membrane-like construction of the flange 9, could also be achieved in that additional cylindrical elastomer layers are integrated into the spherical pivot bearings 5 or 10. The arrangement of the pivot bearings 5 and 10, in the manner shown, ensures that the high radial bearing stiffness necessary for trouble-free functioning is achievable without problems.

For a relatively small helicopter, the leaf springs 7 may, for example, have a width of 1 cm on each side of the slot 8 in the z-direction, and a thickness of also 1 cm, while the diameter of the disc of the wound leaf springs in the winding plane is approximately 15 cm. If a typical spring steel is used for these dimensions, a spring constant of approximately $6.5 \times 10^6$ N/m is provided in the x- or y-directions in contrast to a spring constant of $3 \times 10^5$ N/m in the z-direction.

Although the invention has been described with reference to specific example embodiments, it will be appreciated, that it is intended to cover all modifications and equivalents within the scope of the appended claims.

What I claim is:

1. A vibration isolator having two degrees of freedom and operating according to the anti-resonance principle, comprising a pendulum means, a spring arrangement and means connecting said pendulum means to said spring arrangement, said pendulum means including a pendulum rod and a pendulum weight adjustably mounted on a free end of said pendulum rod, said spring arrangement including an inner ring including attachment means for connection to a first body, an outer ring including attachment means for connection to a second body, and a plurality of curved leaf spring elements connected at one leaf spring end to said inner ring and the other leaf spring end to said outer ring, said connecting means including a first spherical pivot bearing operatively arranged between said inner ring and said pendulum rod, and a second spherical pivot bearing operatively arranged between said outer ring and said pendulum rod, whereby an end of said pendulum rod opposite said free end is supported by both said first and second spherical pivot bearings, and wherein said curved leaf spring elements are flexible so as to allow a relative motion between said inner ring and said outer ring perpendicular to a plane extending through both rings, thus in a direction parallel to said pendulum rod.

2. The vibration isolator of claim 1, wherein each of said first and second spherical pivot bearings is a low-damping elastomer bearing.

3. The vibration isolator of claim 1, wherein said leaf spring elements include slots extending in a lengthwise direction of said leaf springs and thus substantially perpendicular to said pendulum rod.

4. The vibration isolator of claim 1, further comprising a flange (9) which is elastic in a lengthwise direction of said pendulum rod, said outer ring being connected to said second spherical pivot bearing by said flange.

5. The vibration isolator of claim 4, wherein said flange is a disc-like flange made of fiber-reinforced material, which is stiff in a radial direction, but elastic perpendicular to said radial direction which extends perpendicular to said pendulum rod.

* * * * *